(12) United States Patent
Kuo

(10) Patent No.: US 6,408,714 B1
(45) Date of Patent: Jun. 25, 2002

(54) ROTARY DEVICE FOR STUNT BICYCLES

(76) Inventor: Yung-Pin Kuo, No. 55, Alley 121, Lane 175, Kuo Shen Rd., Chang Hwa City (TW)

( * ) Notice: Subject to any disclaimer, the term of this patent is extended or adjusted under 35 U.S.C. 154(b) by 0 days.

(21) Appl. No.: 09/774,692

(22) Filed: Feb. 1, 2001

(30) Foreign Application Priority Data

Dec. 8, 2000 (TW) .......................................... 089221365

(51) Int. Cl.⁷ .............................. B62K 21/12; F16C 1/10
(52) U.S. Cl. ................... 74/551.1; 74/502.4; 74/502.6; 74/500.5; 74/502.2; 188/24.11; 188/24.22; 280/279
(58) Field of Search ........................... 74/502.4, 502.6, 74/501.5 R, 551.1–551.8; 188/24.11, 2 D; 280/279, 280

(56) References Cited

U.S. PATENT DOCUMENTS

| | | | | |
|---|---|---|---|---|
| 4,616,523 A | * | 10/1986 | Jones | ........................... 74/501 |
| 4,653,768 A | * | 3/1987 | Keys | ........................... 280/279 |
| 4,753,448 A | * | 6/1988 | Nagashima | ................. 280/264 |
| 4,770,435 A | * | 9/1988 | Cristie | ........................ 280/279 |
| 5,605,076 A | * | 2/1997 | Wu | ............................. 74/551.1 |
| 5,690,192 A | * | 11/1997 | Kuo | ......................... 188/24.22 |
| 5,732,601 A | * | 3/1998 | Wu | ............................. 74/502.4 |
| 5,775,709 A | * | 7/1998 | Chen | ........................... 280/279 |
| 6,220,398 B1 | * | 4/2001 | Wu | ......................... 188/24.11 |

* cited by examiner

Primary Examiner—Vinh T. Luong
(74) Attorney, Agent, or Firm—Rosenberg, Klein & Lee

(57) ABSTRACT

A rotary device for stunt bicycles includes a bearing set movably mounted to a steerer tube and having two upright lugs and two downward lugs. A first collar is pivotally connected to the upright lugs and a first lever member has one end thereof pivotally connected to the first collar, and the other end of the first lever member is connected to a first brake cable. A second collar is pivotally connected to the downward lugs. A second lever member has one end thereof pivotally connected to the second collar, and the other end of the second lever member is connected to a second brake cable.

9 Claims, 6 Drawing Sheets

ROTARY DEVICE FOR STUNT BICYCLES

FIELD OF THE INVENTION

The present invention relates to a rotary device on the head tube for stunt bicycles and the device employs principle of lever to have better force transferring efficiency.

BACKGROUND OF THE INVENTION

A conventional rotary device 80 for stunt bicycles is shown in FIG. 6 and generally, one of the two brake cables has to be separated into two breads 82 by using a separation device 81 as shown. The two breads 82 of the brake cable are respectively connected to two connection ports 83 on two far ends of a top plate. A lower plate has two connection ports 84 on two far ends thereof and two breads 820 extend from the two connection ports 84 and are connected to a rear brake mechanism. The top plate and the lower plate is connected with each other so that when the breads 82 are pulled, the breads 820 are activated to stop the rear wheel. The other brake cable 820 extends into the steerer tube and the head tube and is connected to a front brake mechanism. The conventional rotary device 80 involves complicated structure and the two breads 82 have to be pulled in balance to properly operate activate the brake system or jam problems could happen. The separation device 81 is an extra part that makes the assembly processes to be complicated.

The present invention intends to provide a rotary device that has simple structure and has a precise force transferring ability which makes the brake actions sharp and precise.

SUMMARY OF THE INVENTION

In accordance with one aspect of the present invention, there is provided a rotary device for stunt bicycles. The rotary device comprises a bearing set movably mounted to a steerer tube and has two upright lugs and two downward lugs. A first collar is mounted to the steerer tube and has a first connection portion and a second connection portion respectively radially extending outward therefrom. The two upright lugs are pivotally connected to said first collar. A first lever member has a ring portion is mounted to the steerer tube and has a first connection port and a second connection port respectively radially extending outward therefrom. A first brake cable extends through the first connection port and is connected to the first connection portion of said first collar. The second connection port is pivotally connected to said second connection portion of said first collar. A second collar is mounted to the head tube and has a third connection portion and a fourth connection portion respectively radially extending outward from said second collar. The two downward lugs are pivotally connected to said second collar. A second lever member has a ring portion mounted to the head tube and a third connection port and a fourth connection port respectively radially extend outward from said second lever member. A second brake cable passes through the third connection port and is connected to said third connection portion of said second collar. The fourth connection port is pivotally connected to said fourth connection portion of said second collar.

The primary object of the present invention is to provide a rotary device for stunt bicycles wherein the bearing set is movably mounted to the steerer tube and pivotally connected to the two collars which are respectively connected to two brake cables so that the bearing set play a mediate role to allow the two collars to be pivoted to activate the brake system precisely.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
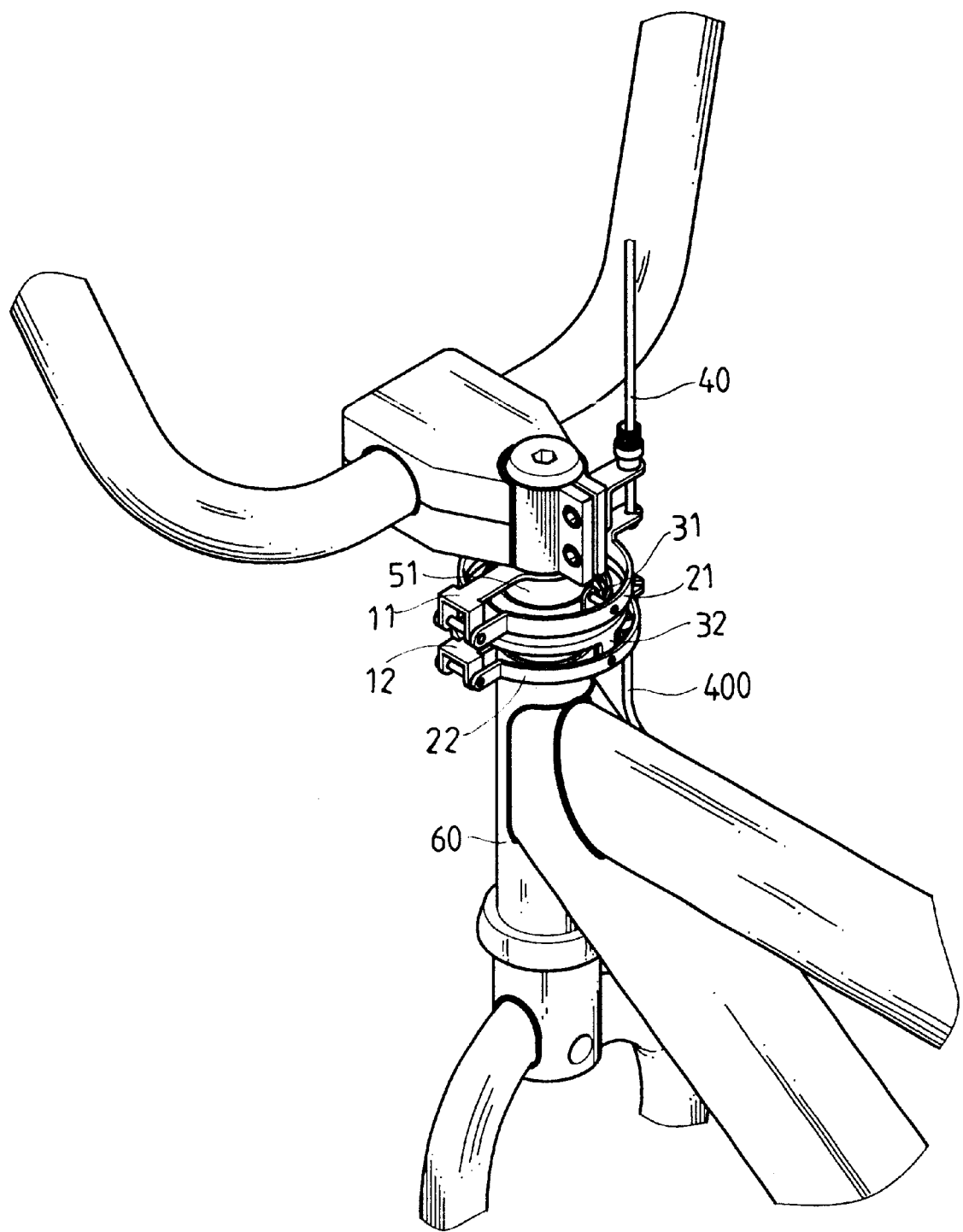
FIG. 1 is a perspective view to show the rotary device on a stunt bicycle of the present invention.
Figure 2:
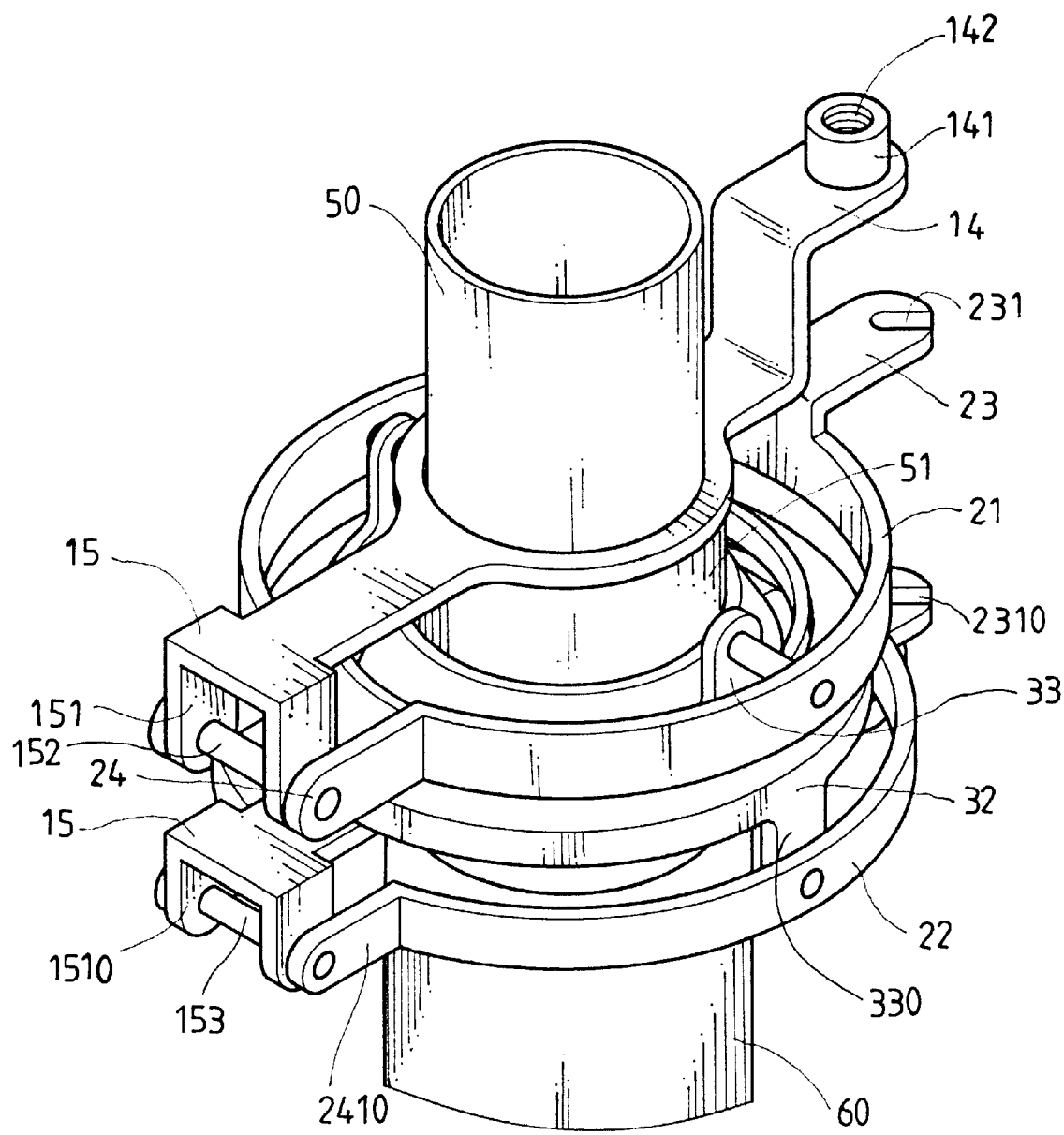
FIG. 2 is an enlarged perspective view to show the rotary device of the present invention.
Figure 3:
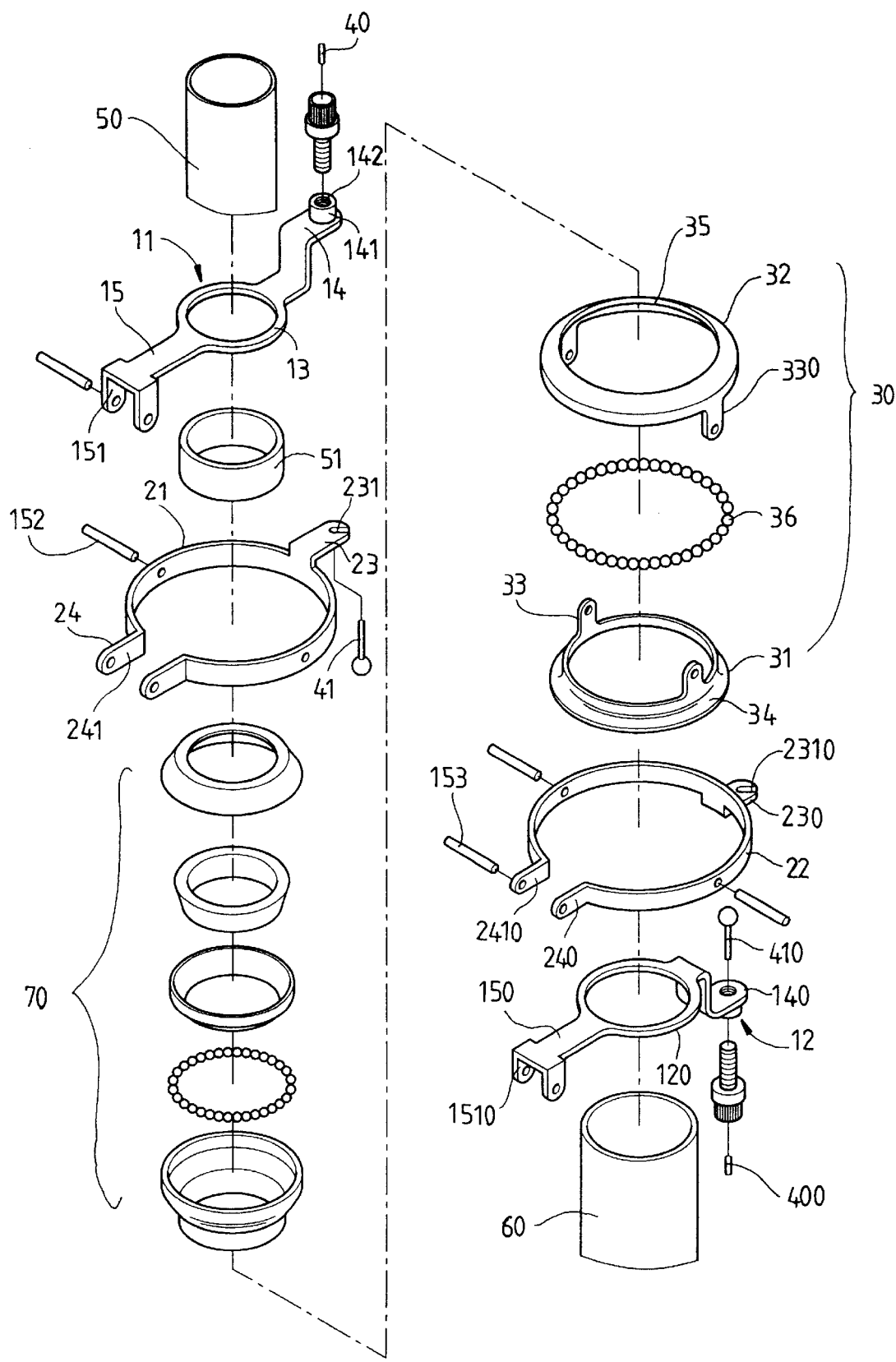
FIG. 3 is an exploded view to show the rotary device of the present invention.
Figure 4:
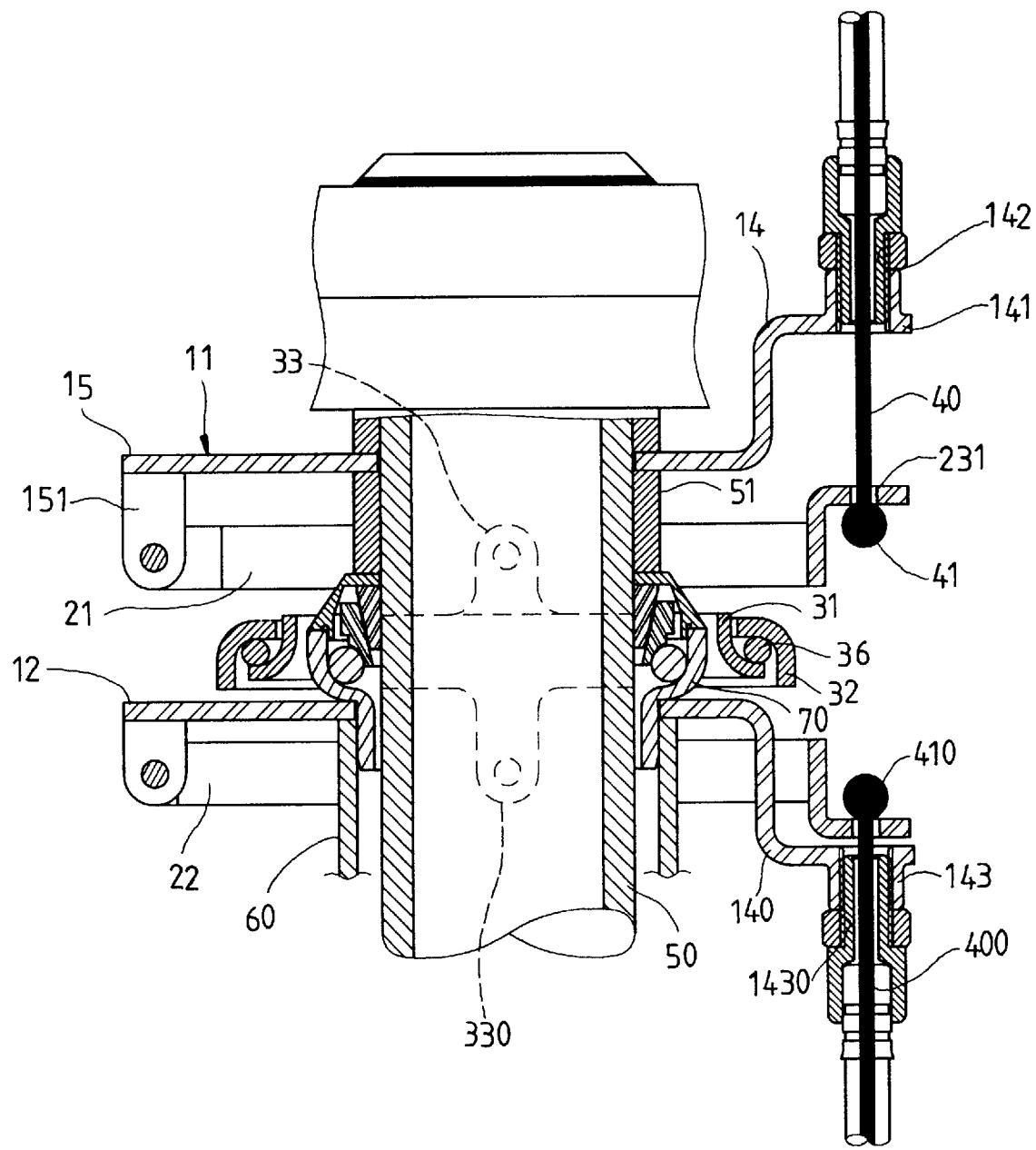
FIG. 4 is a cross sectional view to show the rotary device of the present invention.

Referring to FIGS. 1 to 4, the rotary device of the present invention comprises a bearing set 30 movably mounted to a steerer tube 50 which extends through a head tube 60 with a bearing journal 70 mounted to the head tube 60. The bearing set 30 includes an inner ring 31 and an outer ring 32, wherein said inner ring 31 has a groove 34 defined in an outer periphery thereof and said outer ring 32 has a groove 35 defined in an inner periphery thereof so as to receive balls 36 between said grooves 34, 35. Two upright lugs 33 extend from an inner periphery of said inner ring 31 and two downward lugs 330 extend from an outer periphery of said outer ring 32.

A separation collar 51 is mounted to the steerer tube 50 and a first collar 21 is mounted to the steerer tube 50. A first connection portion 23 and a second connection portion 24 respectively radially extend outward from said first collar 21. A first lever member 11 has a ring portion 13 mounted to the steerer tube 50. A first connection port 14 and a second connection port 15 respectively radially extend outward from said first lever member 11. The second connection port 15 of said first lever member 11 has a fork 151. The ring portion 13 of said first lever member 11 contacts on a top end of said separation collar 51 so that a gap is defined between said first lever member 11 and said first collar 21. The second connection portion 24 of said first collar 21 has two end plates 241 which are pivotally connected to said fork 151 by a pin 152. A first tube 141 extend from said first connection port 14 and a threaded inner periphery 142 is defined in said first tube 141 so as to be connected to a brake cable adjusting bolt therein. A first brake cable 40 extends through the brake cable adjusting bolt and an end 41 of the first brake cable 40 is engaged with a slot 231 defined in the first connection portion 23 of said first collar 21. The two upright lugs 33 are pivotally connected to said first collar 21.

A second collar 22 is mounted to the head tube 60, and a third connection portion 230 and a fourth connection portion 240 respectively radially extend outward from said second collar 22. The third connection portion 230 of said second collar 22 has a slot 2310 and the two downward lugs 330 are pivotally connected to said second collar 21. A second lever member 12 has a ring portion 120 which is mounted to the head tube 60, and a third connection port 140 and a fourth connection port 150 respectively radially extend outward from said second lever member 12. The fourth connection portion 240 of said second collar 22 has two end plates 2410 and said fourth connection port 150 of said second lever member 12 has a fork 15 10 which is pivotally connected to said two end plates 2410 by a pin 153. A second tube 143 extends from said third connection port 140 and a threaded inner periphery 1430 is defined in said second tube 143 so as to be connected to a brake cable adjusting bolt therein and a second brake cable 400 extends through the brake cable adjusting bolt. An end 410 of the second brake cable 400 is engaged with the slot 2310 of the third connection portion 230 of said second collar 22.

Figure 5:
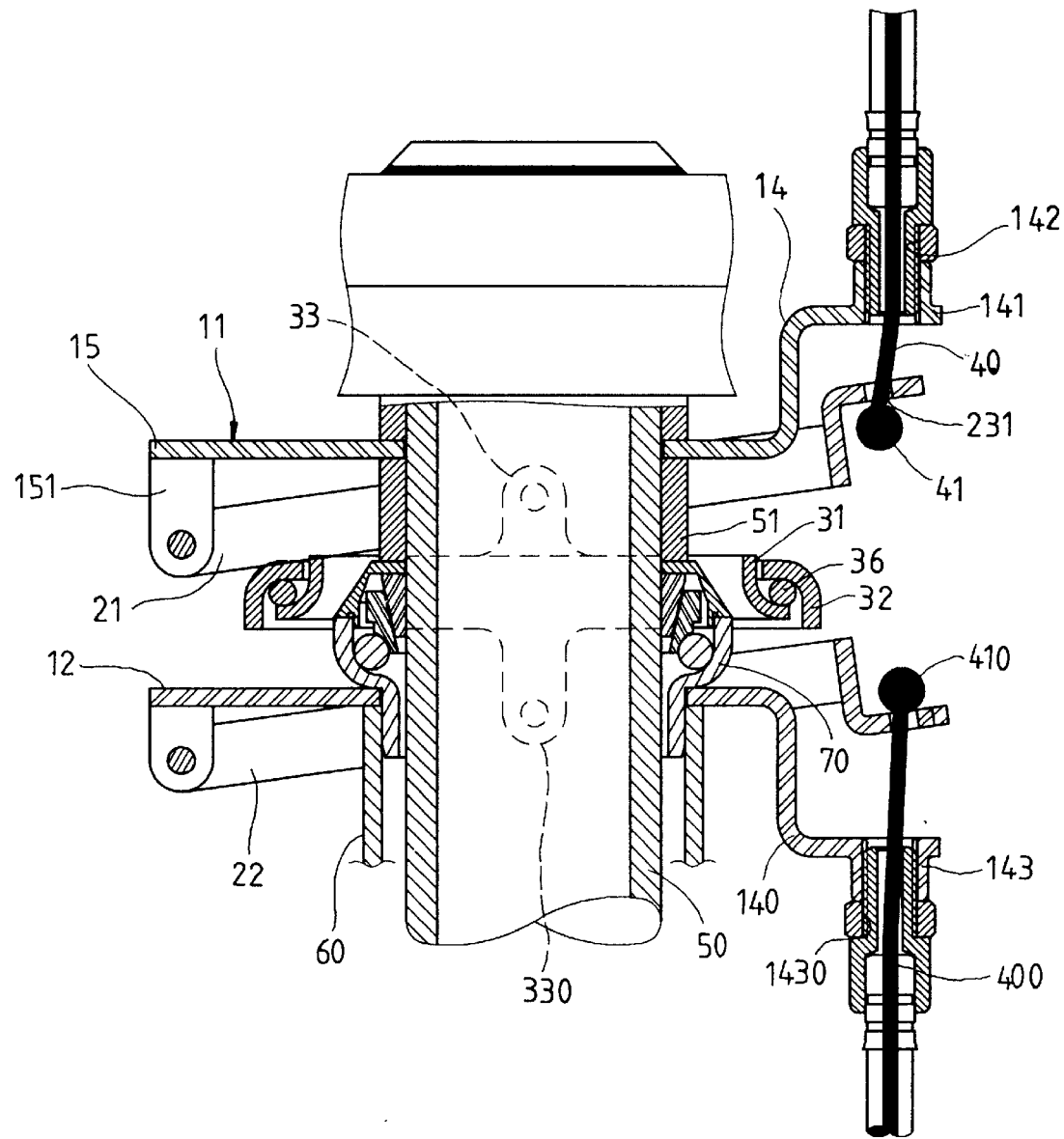
FIG. 5 is a cross sectional view to show the rotary device of the present invention wherein the two brake cables are pulled.
Figure 6:
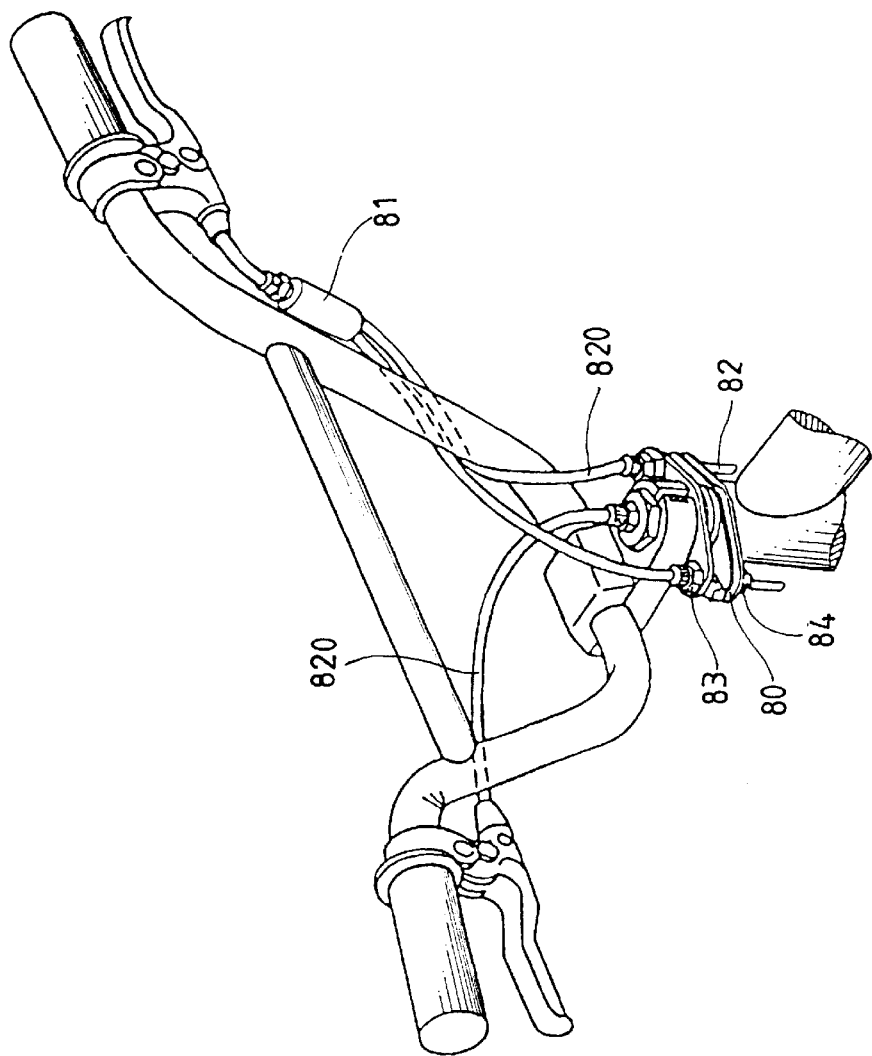
FIG. 6 is a perspective view to show a conventional rotary device on a stunt bicycle.

Referring to FIG. 5, when pulling a brake lever which is connected to the first brake cable 40, the first connection portion 23 of the first collar 21 is lifted and the first collar 21 is pivoted about the pin 152. The movement of the first collar 21 lifts the bearing set 30 which lifts the second collar 22 because the connection of the downward lugs 330 and the second collar 22. The second collar 22 is then pivoted about the pin 153 and pulls the second brake cable 400.

It is to be noted that there is only one connection between the first brake cable 40 and the first collar 11, and between the second brake cable 400 and the second collar 22 so that the brake action is simplified and the precisely proceeded by simply pulling the brake lever. The first collar 11 and the second collar 22 are pivoted as a lever action which is efficient and the number of parts of the rotary device are reduced.

While we have shown and described various embodiments in accordance with the present invention, it should be clear to those skilled in the art that further embodiments may be made without departing from the scope and spirit of the present invention.

What is claimed is:

1. A rotary device for stunt bicycles, comprising:

a bearing set adapted to be movably mounted to a steerer tube and having two upright lugs and two downward lugs;

a first collar adapted mounted to the steerer tube, a first connection portion and a second connection portion respectively radially extending outward from said first collar, said two upright lugs pivotally connected to said first collar;

a first lever member having a ring portion adapted to be mounted to the steerer tube, a first connection port and a second connection port respectively radially extending outward from said first lever member, said first connection port adapted to allow a first brake cable to pass and said first connection portion of said first collar adapted to be connected to the first brake cable, said second connection port pivotally connected to said second connection portion of said first collar;

a second collar adapted mounted to the head tube, a third connection portion and a fourth connection portion respectively radially extending outward from said second collar, said two downward lugs pivotally connected to said second collar, and a second lever member having a ring portion adapted to be mounted to the head tube, a third connection port and a fourth connection port respectively radially extending outward from said second lever member, said third connection port adapted to allow a second brake cable to pass and said third connection portion of said second collar being adapted to be connected to the second brake cable, said fourth connection port pivotally connected to said fourth connection portion of said second collar.

2. The rotary device as claimed in claim 1, wherein said first connection portion of said first collar has a slot so as to be adapted to engage an end of the first brake cable.

3. The rotary device as claimed in claim 1, wherein said third connection portion of said second collar has a slot so as to be adapted to engage an end of the second brake cable.

4. The rotary device as claimed in claim 1 wherein said second connection portion of said first collar has two end plates and said second connection port of said first lever member has a fork which is pivotally connected to said two end plates by a pin.

5. The rotary device as claimed in claim 1 wherein said fourth connection portion of said second collar has two end plates and said fourth connection port of said second lever member has a fork which is pivotally connected to said two end plates by a pin.

6. The rotary device as claimed in claim 1 further comprising a first tube extending from said first connection port and a threaded inner periphery defined in said first tube so as to be adapted connected to a brake cable adjusting bolt therein.

7. The rotary device as claimed in claim 1 further comprising a second tube extending from said third connection port and a threaded inner periphery defined in said second tube so as to be adapted connected to a brake cable adjusting bolt therein.

8. The rotary device as claimed in claim 1, wherein said bearing set has an inner ring and an outer ring, said inner ring having a groove defined in an outer periphery thereof and said outer ring having a groove defined in an inner periphery thereof, balls retained between said grooves, said two upright lugs extending from an inner periphery of said inner ring and said two downward lugs extending from an outer periphery of said outer ring.

9. The rotary device as claimed in claim 1 further comprising a separation collar adapted to be mounted to the steerer tube and said ring portion of said first lever member contacting on a top end of said separation collar so that a gap is defined between said first lever member and said first collar.

* * * * *